July 3, 1962 S. DUINKER ET AL 3,042,758

COMBINATION OF RADIO RECEIVERS AND MAGNETIC RECORD REPRODUCING DEVICES

Filed April 22, 1957 3 Sheets-Sheet 1

INVENTORS
SIMON DUINKER
JACOB KOORNEEF

BY Frank R. Trifari
AGENT

INVENTORS
SIMON DUINKER
JACOB KOORNEEF
BY Frank R. Jeifari
AGENT

INVENTORS
SIMON DUINKER
JACOB KOORNEEF

BY Frank R. Jerifari
AGENT

United States Patent Office 3,042,758
Patented July 3, 1962

3,042,758
COMBINATION OF RADIO RECEIVERS AND MAGNETIC RECORD REPRODUCING DEVICES

Simon Duinker and Jacob Koorneef, both of Eindhoven, Netherlands, assignors to North American Philips Company, Inc., New York, N.Y., a corporation of Delaware Filed Apr. 22, 1957, Ser. No. 654,314
Claims priority, application Netherlands June 8, 1956
4 Claims. (Cl. 179—100.11)

This invention relates to combinations of superheterodyne radio receivers and magnetic record reproducing devices.

In known installations of this kind use is made of a magnetic record reproducing head by which the signals magnetically registered on a carrier suitable for the purpose are converted into voltages which are the derivative of the magnetic fluxes produced in the reproducing head by the registered signals. These voltages are applied to an integrating network and, after passing through one or more amplifier stages, of which the low-frequency stage of the radio may form part, applied to the loudspeakers of the installation.

An object of the invention is to provide an installation which yields qualitatively better results than known installations, with a large proportion of the task of the magnetic record reproducing device being fulfilled by the radio receiver.

The combination according to the invention is characterized in that the reproducing head of the magnetic record reproducing device is of the kind in which the magnetic fluxes produced in the head by signals magnetically registered on a carrier suitable for the purpose, are modulated on magnetic alternating fields produced in the head by means of a coil fed with alternating current, which coil for this purpose is wound on a portion of the head, and that, if the combination is adjusted for reproduction of the said signals registered on a carrier, the output signal of the head, which is derived from a winding likewise provided on the head, is supplied to a stage of the wireless receiver located between the high-frequency stage and the low-frequency stage thereof.

Figure 1:
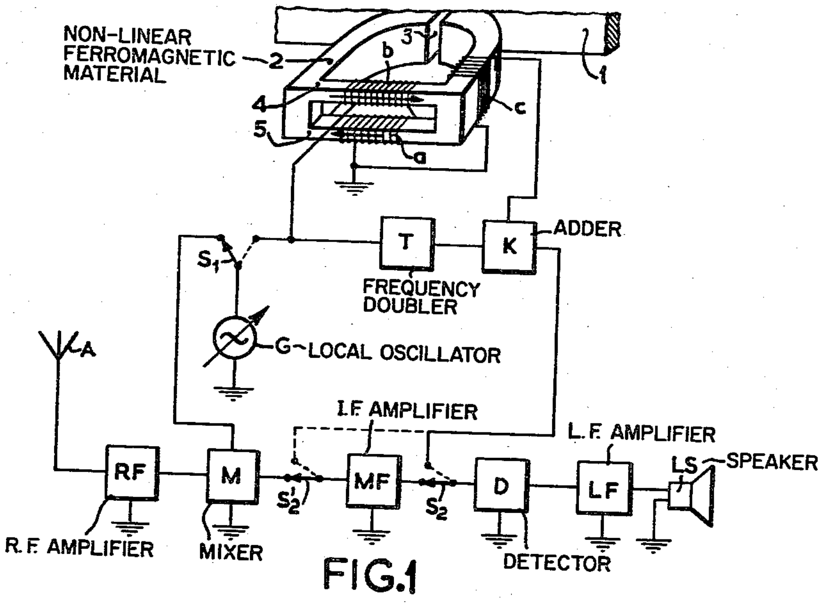
Figure 2:
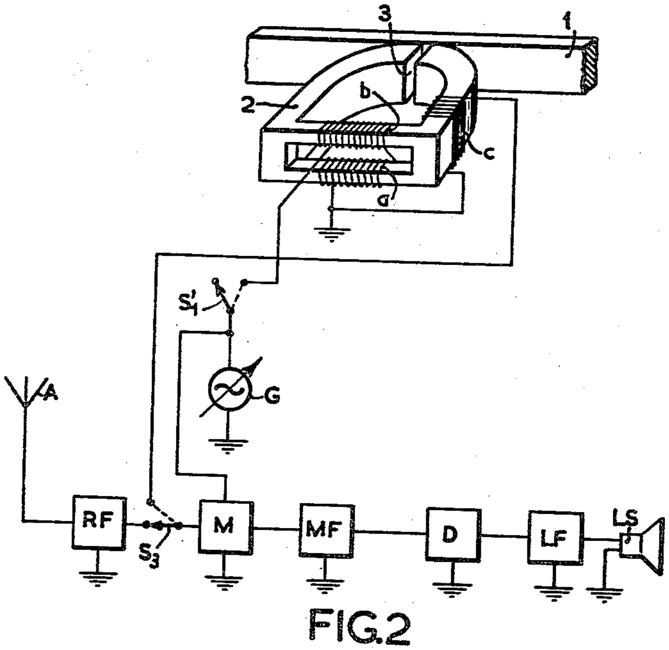

In order that the invention may be readily carried into effect, several embodiments will now be described more fully, by way of example, with reference to the accompanying drawings, in which FIGS. 1 and 2 show block diagrams of embodiments of a combination according to the invention.

Figure 3:
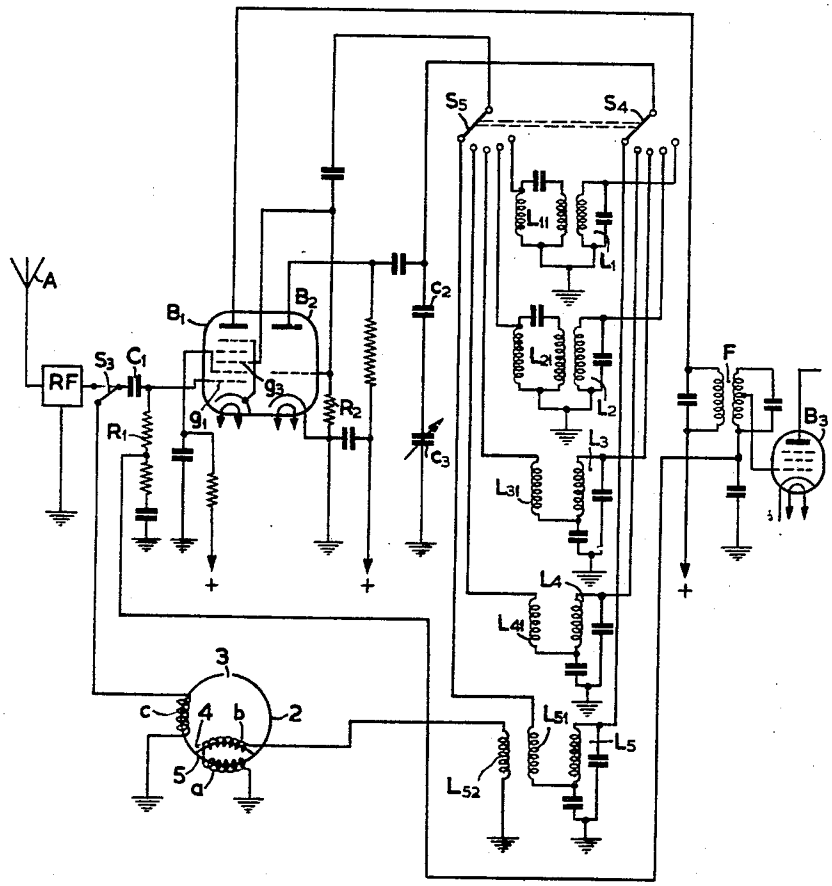

FIG. 3 shows the embodiment of FIG. 2 which is partly elaborated in greater detail.

Figure 4:
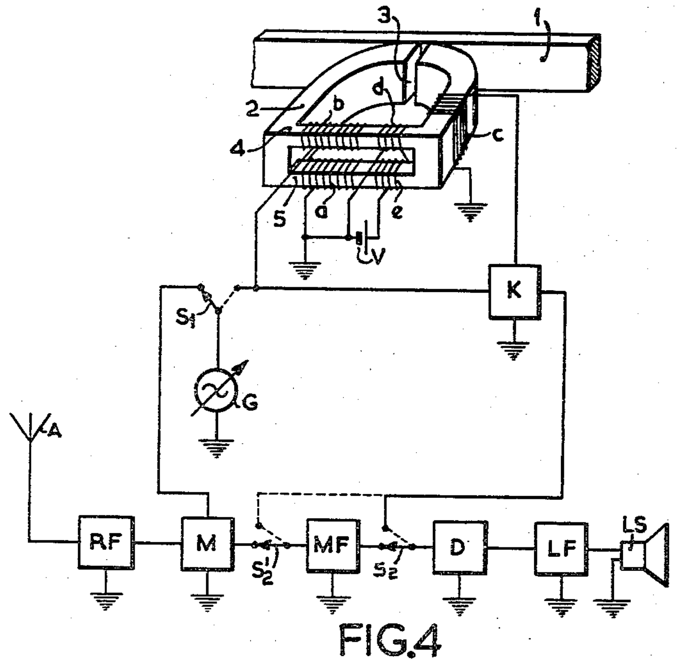
Figures 5, 6:
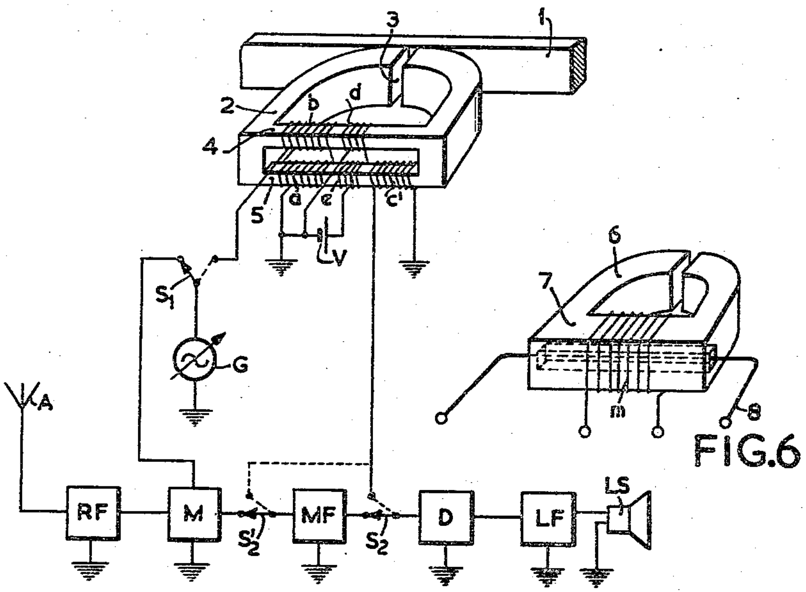

FIGS. 4 and 5 also show block diagrams of embodiments of the combination according to the invention and FIG. 6 shows a reproducing head of the kind which may be used with the invention.

FIG. 1 shows a block diagram of one embodiment of a combination of a radio receiver of the superheterodyne type and a magnetic record reproducing device according to the invention. A indicates a receiving aerial, RF a high-frequency stage, and M a mixing stage, which has also supplied to it, via a switch $S_1$, the output voltage of a local oscillator G. The output voltage of mixing stage M is applied to an intermediate-frequency stage MF, which is also connected via a switch $S_2$ to a detector D. The output signal of detector D is supplied via a low-frequency stage LF to a loudspeaker LS.

Furthermore, reference numeral 1 indicates a magnetic tape with the magnetic field to be scanned, 2 a ferromagnetic circuit having a field gap 3 and two parallel, magnetically substantially identical branches 4 and 5 consisting of material having a magnetization curve of non-linear shape. The term "magnetically identical branches" is to be understood to mean branches having the same magnetization curves, magnetic reluctance, etc.

*a* and *b* are identical windings, the winding sense of which is such that, if the fundamental frequency component of the magnetic flux produced by an alternating current supplied to *a* and *b*, has at 4 the direction indicated by the arrow, this component has the opposite direction at 5.

*c* indicates an output winding, T a frequency doubler and K an adding device.

When the switches $S_1$ and $S_2$ occupy the positions shown, the device fulfills the function of an ordinary radio receiver of the superheterodyne type. An incoming high-frequency signal, after being amplified in the high-frequency stage RF is converted in the mixing stage M, by means of the output signal of local oscillator G, into an intermediate-frequency signal of fixed carrier-wave frequency. The local oscillator is made variable for this purpose. Said intermediate frequency signal is supplied to detector D, in which it is converted into a low-frequency signal. The latter signal is supplied via low-frequency stage LF to the loudspeaker LS.

The installation is adjusted as a magnetic record reproducing device by switching the switches $S_1$ and $S_2$ into the positions shown in dotted line.

The magnetic record reproducing device operates as follows: In the absence of a field to be scanned, there is no flux, as is well-known, in the non-divided section of the ferromagnetic circuit, for example at the output winding *c*. If, however, a field is present, there occurs in the non-divided section and hence also at the winding *c* a modulated flux, the components of which, each modulated by the magnetic fields to be reproduced, have carrier-wave frequencies which are even multiples of the fundamental frequency of the flux produced in the parallel branches by the local oscillator, but in which said carrier waves themselves are completely suppressed. Consequently, across the winding *c* now occurs a voltage, the components of which have carrier-wave frequencies which are likewise even multiples of the fundamental frequency of the flux produced in the parallel branches by the local oscillator, but in which, as before, the carrier-waves themselves are completely suppressed.

The output voltage of the winding *c* is now applied to the adding device K, which has also supplied to it the output voltage of the device T. As a rule, for detecting the output signal of the winding *c*, use will be made of that component, the carrier-wave frequency of which is twice that of the oscillation supplied by the oscillator G. In this case, the device T is a frequency doubler. The component in the output signal of the winding *c*, the carrier-wave frequency of which is twice that of the oscillation supplied by the oscillator G, thus has the associated carrier wave added to it in the adding device K.

Said mixture is supplied via switch $S_2$ to the detector D and detected therein. The resultant low-frequency signal is supplied via low-frequency stage LF to the loudspeaker LS.

The magnetic record reproducing head as above described affords the advantage with respect to an ordinary head that the current or voltage, which is a measure of the magnetic fields scanned, is substantially independent of frequency and that consequently very low frequencies may also be scanned and reproduced without difficulty. The cost of additional parts resulting from the use of such a magnetic record reproducing head is considerably reduced by utilizing the local oscillator G as well as the detector D and the low-frequency stage LF not only for the receiver but also for the magnetic record reproducing device. It is to be noted that the frequency of the oscillator, if not unduly low, may be chosen at will.

It will be evident that the invention is not limited to a magnetic record reproducing head of the kind described with reference to FIG. 1. FIG. 6, for example, shows a construction known per se, in which the head is constituted by a non-closed ferromagnetic circuit 6, partly tubular in shape, the tubular portion 7 which is of material having a magnetisation curve of non-linear form including a coil 8, which has supplied to it the said alternating current controling the tubular portion up to the non-linear part of the magnetisation curve. Across the output winding *m* occurs, similarly as in the reproducing head described with reference to FIG. 1, a modulated carrier-wave having a frequency which is twice that of the alternating current supplied to the coil 8, but in which this carrier wave itself is absent. The head shown in FIG. 1 may thus without objection be replaced by the head shown in FIG. 6.

If the output signal of the winding *c* is to undergo an additional amplification, then according to a further feature of the invention this signal, instead of being supplied to the detector D via the switch $S_2$, may be supplied to the intermediate-frequency stage MF via the switch $S_2'$ (see connection shown in dotted line). In view of the fact that MF is tuned to a given frequency, the local oscillator G is required to be adjusted to a frequency which is half the tuning frequency of the intermediate-frequency stage. If the local oscillator cannot provide this frequency without further expedients, it is possible either to provide the oscillator with an additional set of coils or capacitors which are also switched into circuit when the combination is made operative as a record reproducing device, or to switch over to an additional oscillator specially provided for the purpose.

It is otherwise also possible, if the local oscillator cannot provide said frequency, to vary the tuning frequency of the intermediate-frequency stage in a manner such that the frequency, which is half the new tuning frequency of the intermediate-frequency stage, lies in the frequency range of the local oscillator.

FIG. 2 shows one embodiment of a combination according to the invention in which the mixing stage also fulfills a function in reproducing the signals magnetically registered on a carrier. Corresponding parts of this embodiment and that of FIG. 1 are indicated by the same reference numerals. The figure shows that the output winding *c* of the reproducing head is connected to the mixing stage M via a switch $S_3$, which is provided between the high-frequency stage and the mixing stage and which occupies the position shown when the combination operates as a radio receiver.

FIG. 2 also shows that the switch $S_1'$ connects the oscillator to the mixing stage in either position, i.e., the oscillator is connected to the mixing stage at all times.

If the switches $S_1'$ and $S_3$ occupy the positions shown, the device operates as an ordinary radio-receiver. The installation is adjusted as a record reproducing device by switching the switches into the position shown in dotted line and also adjusting the local oscillator to a frequency equal to the tuning frequency of the intermediate-frequency stage.

Assuming said frequency to be $$\frac{\omega_0}{2\pi}$$

For the oscillator oscillation it is then possible to write $\beta_0 \cos \omega_0 t$, wherein $\beta$ represents a constant. Thus, if the frequency of the signal registered on the carrier 1 is $$\frac{\omega p}{2\pi}$$

the output signal which occurs across the winding *c* is $\beta_p \cos (2\omega_0 \pm \omega_p)t$, wherein $\beta_p$ likewise represents a constant.

In the mixing stage there is formed:

$$(\alpha_0+\beta_0) \cos \omega_0 t[\alpha_p+\beta_p \cos (2\omega_0 \pm \omega_p)t]$$

wherein $\alpha_0$ and $\alpha_p$ are constants, the values of which are dependent upon the adjustment of the mixing stage. It is possible to substitute:

$$\alpha_0\alpha_p+\alpha_0\beta_p \cos (2\omega_0 \pm \omega_p)t+\alpha_p\beta_0 \cos \omega_0 t+ \tfrac{1}{2}\beta_0\beta_p \cos (\omega_0 \pm \omega_p)t+\tfrac{1}{2}\beta_0\beta_p \cos (3\omega_0+\omega_p)t$$

Since the intermediate-frequency stage is tuned to the frequency $$\frac{\omega_0}{2\pi}$$

there occurs across the input circuit of the intermediate-frequency stage the signal:

$$\alpha_p\beta_0 \cos \omega_0 t+\tfrac{1}{2}\beta_0\beta_p \cos (\omega_0 \pm \omega_p)t$$

This signal thus also contains the carrier wave itself and the output signal of the intermediate-frequency stage may be directly supplied for detection to the detector D.

For adjusting values of the various constants suitable for the above-described mixture, it is possible at the same time as the installation is switched-over from radio-receiver to record reproducing device, to switch, if necessary, impedances and/or biasing potentials into the mixing-stage circuit.

FIG. 3 shows the embodiment of FIG. 2 which is partly elaborated further. As before, A indicates a receiving aerial and RF a high-frequency stage. $S_3$ is a switch by means of which the high-frequency stage may be connected via a network $R_1$—$C_1$ to a control grid $g_1$ of an electron tube $B_1$ which forms part of the mixing stage. The anode circuit of tube $B_1$ includes a band-pass filter F, which constitutes the input circuit of an electron tube $B_3$ which forms part of the intermediate-frequency stage.

The output signal of a local oscillator is supplied to a further control grid $g_3$ of tube $B_1$. This oscillator is constituted by a triode $B_2$, the anode circuit of which includes an oscillatory circuit comprising capacitors $C_2$ and $C_3$ and one of the coil sections $L_1$, $L_2$, $L_3$, $L_4$, $L_5$ and the control grid circuit of which includes, via a resistor $R_2$, one of the feed back coils $L_{11}$, $L_{21}$, $L_{31}$, $L_{41}$, $L_{51}$, which are coupled by inductive means with the coil sections $L_1$, $L_2$, $L_3$, $L_4$, $L_5$ respectively. The combinations $L_1$, $L_{11}$; $L_2$, $L_{21}$; $L_3$, $L_{31}$ and $L_4$, $L_{41}$ form part of the local oscillator in so far it is used as part of a radio-receiver. Dependent upon the desired wavelength range to which the receiver is adjusted, one of said combinations is switched into the oscillator circuit by means of interconnected switches $S_4$ and $S_5$, which together fulfill a similar function as the switch $S_1'$ of FIG. 2.

The capacitor $C_3$ is the tuning capacitor and hence as such variable.

The combination $L_5$, $L_{51}$ serves to produce the alternating current to be supplied to the magnetic record reproducing head 2. The frequency determined by $L_5$ and $C_3$ must in this case be equal to the tuning frequency of the intermediate-frequency stage. $C_3$ is thus required to be adjusted to a fixed value. If desired, it is alternatively possible to switch into circuit a fixed capacitor instead of capacitor $C_3$ by means of a switch.

The switches $S_3$, $S_4$ and $S_5$ in FIG. 3 occupy positions such that the installation can operate as a magnetic record reproducing device. The oscillation set up across circuit $L_5$—$C_3$ is supplied by means of a coil $L_{52}$, which is coupled by inductive means with $L_5$, to the windings *a* and *b* of the magnetic record reproducing head. The output voltage set up across the winding *c* is supplied via switch $S_3$ to the input circuit of the mixing stage. The carrier-wave frequency of this output signal is twice the frequency of the intermediate-frequency stage. However the carrier wave itself is not contained in this signal. The oscillator oscillation itself is likewise supplied to the mixing stage. As previously explained, a signal occurring at the output of the mixing stage as a carrier-wave frequency equal to the tuning frequency of the intermediate-frequency stage, which signal furthermore now contains the carrier-wave itself.

FIG. 4 shows one embodiment of a combination according to the invention in which the output signal of the magnetic record reproducing head has a carrier-wave frequency equal to the frequency of the alternating current supplied to the magnetic record reproducing device, but in which, as before, the carrier wave itself is not present.

The fact that this carrier-wave frequency is equal to the frequency of said alternating current is achieved by introducing direct-current fluxes into the two branches of the head, which fluxes have opposite directions in the branches and which compensate one another in the non-divided section of the head.

Corresponding parts of said device and those of FIGS. 1 and 2 are indicated by the same reference numerals. The two branches 4 and 5 have now wound on them two further identical windings *d* and *e*, which are connected to a direct-voltage source V. The winding sense of the windings *d* and *e* is such that the direct-current fluxes in the branches 4 and 5 have the same value, but are oppositely directed. A signal now occurs across the winding *c* having a carrier-wave frequency which is equal to the frequency of the alternating current supplied to the windings *a* and *b*. The output voltage of the local oscillator may now be supplied to the adding device K without the intermediary of a frequency doubler.

If in this case the output signal K is supplied to the intermediate-frequency stage (by means of the connection via switch $S_2'$ as shown in dashed line) the frequency of the alternating current supplied by the local oscillator must now be equal to the tuning frequency of the intermediate-frequency stage.

It will otherwise be evident, that the direct-current fluxes in the branches 4 and 5 may alternatively be produced in several other ways, for example by replacing the direct-current source V by an element conductive in one direction, if desired with a smoothing network, or by causing the local oscillator to supply an alternating current which also contains a direct-current component. In this case, the windings *d* and *e* may be dispensed with.

Even when use is made of a record reproducing head as shown in FIG. 4, it is possible to utilise the mixing stage. In a similar manner as in the device shown in FIG. 2, the output signal of the head may be supplied to one input of the mixing stage and the output oscillation of the oscillator to the other input.

If, as before, the frequency of the oscillation supplied by the oscillator is $$\frac{\omega_0}{2\pi}$$

it is now possible to substitute for the output voltage of the record reproducing head:

$$\beta_p \cos (\omega_0 \pm \omega_p)t$$

In the mixing stage there is formed:

$$(\alpha_0 + \beta_0 \cos \omega_0 t)[\alpha_p + \beta_p \cos (\omega_0 \pm \omega_p)t]$$

This can be substituted by:

$$\alpha_0\alpha_p + \alpha_0\beta_p \cos (\omega_0 \pm \omega_p)t + \alpha_p\beta_0 \cos \omega_0 t + \beta_0 + \beta_p \cos \omega_p t + \tfrac{1}{2}\beta_0\beta_p \cos (2\omega_0 \pm \omega_p)t$$

This signal may be supplied, if desired via a low-pass filter immediately to the loudspeaker, but if the intermediate-frequency stage is tuned to the frequency $$\frac{\omega_0}{2\pi}$$

it may alternatively be supplied directly to this intermediate-frequency stage, since now across the input circuit of this stage there occurs the signal:

$$\alpha_0\beta_p \cos (\omega_0 \pm \omega_p)t + \alpha_0\beta_0 \cos \omega_0 t$$

and hence the modulated desired signal together with the associated carrier wave.

Apart from the means for producing the direct-current fluxes in the parallel branches of the head, the circuit arrangement of the installation in which use is made of the last-mentioned method is exactly analogous to that of the installation shown in FIG. 2.

In conclusion, FIG. 5 shows an embodiment of a combination according to the invention in which the output signal of the record reproducing head not only has a carrier-wave frequency equal to the frequency of the alternating current supplied to the head, but in which furthermore the carrier-wave itself is present. This implies that said output signal, without the addition of the oscillator oscillation, may be supplied to either the detector D or the intermediate-frequency stagt MF. In the latter case, the frequency of the oscillation supplied by the local oscillator must, as before, be equal to the tuning frequency of the intermediate-frequency stage.

The fact that this carrier wave, the frequency of which is equal to the frequency of the alternating current supplied to the windings *a* and *b*, is present in the output signal is achieved in that beside a similar introduction of direct-current fluxes into the branches 4 and 5 as in the device of FIG. 4, an output winding c′ is wound around one of the branches 4 and 5. However, in this case it is necessary to ensure that the two branches are substantially equally loaded, since unequal load would result in the direct-current fluxes not compensating one another in the remaining part of the ferromagnetic circuit, so that the quality of reproduction of the magnetic record reproducing device would be detrimentally affected. However, in practice, one extremity of the winding c′ is usually connected to a control grid of an electron tube in a manner such that this winding does not substantially convey current. In this case, there is hardly any question of the branch concerned being loaded, so that both branches may be regarded as unloaded.

It is to be noted that, if the installation is adjusted as a magnetic record reproducing device, the quality requirements imposed upon the various tuning circuits may be less severe, since it is not now necessary to make allowance for other transmitters interfering the desired transmission. It is thus possible to permit broader frequency bands of the signals to be reproduced. For this purpose, for example, it is possible to switch resistors in parallel to the tuning circuits of the intermediate-frequency stage at the same time as the combination is switched-over to magnetic record reproducing device.

What is claimed is:

1. The combination of a superheterodyne radio receiver and a magnetic record reproducing device composed of a ferromagnetic material, said radio receiver comprising a high frequency amplifying stage, a local oscillator stage, a mixer stage, an intermediate frequency stage, a detector, and a low frequency stage, an input winding magnetically coupled to said reproducing device on one portion thereof, a first selective connection between said input coil and the local oscillator, a permanent connection between the oscillator and the mixer stage, a magnetic record carrier adapted to move past said reproducing device, the magnetic alternating flux in said device caused by the local oscillator being modulated by signals magnetically registered on the carrier, an output winding coupled to a second portion of said reproducing device, and a second selective connection between said output winding and the mixing stage.

2. In combination, a superheterodyne radio receiver comprising a local oscillator and a mixer, a magnetic record reproducing device composed of a ferromagnetic material, an input winding magnetically coupled to said reproducing device on one portion thereof, a first selective connection between said input winding and the local oscillator, a permanent connection between the oscillator and one input of the mixer stage, a magnetic record carrier moving past said reproducing device, the magnetic alternating flux in said device caused by the local oscillator being modulated by signals magnetically registered on the carrier, an output winding coupled to a second portion of said reproducing device, and a second selective connection between said output winding and a second input of the mixer stage, said first and second selective connections connecting said input and output widings to the local oscillator and the mixer, respectively, when it is desired to reproduce signals registered on the carrier.

3. The combination of claim 1, wherein said reproducing device is constituted by a magnetic circuit having a gap therein past which the record carrier moves, the circuit being partly divided into two magnetically substantially identical branches each consisting of magnetic material having a magnetization curve of non-linear form, said input winding being wound on said branches, and said output winding being wound on the undivided portion of the circuit.

4. The combination of claim 2, wherein said reproducing device is constituted by a magnetic circuit having a gap therein past which the record carrier moves, the circuit being partly divided into two magnetically substantially identical branches each consisting of magnetic material having a magnetization curve of non-linear form, said input winding being wound on said branches, and said output winding being wound on the undivided portion of the circuit.

References Cited in the file of this patent

UNITED STATES PATENTS

| | | |
|---|---|---|
| 2,436,946 | Tatro | Mar. 2, 1948 |
| 2,488,927 | Owens | Nov. 22, 1949 |
| 2,608,621 | Peterson | Aug. 26, 1952 |
| 2,813,155 | Owen et al. | Nov. 12, 1957 |
| 2,822,533 | Duinker et al. | Feb. 4, 1958 |

FOREIGN PATENTS

| | | |
|---|---|---|
| 1,101,937 | France | Apr. 27, 1955 |